United States Patent
Kaja et al.

(10) Patent No.: US 11,449,853 B2
(45) Date of Patent: Sep. 20, 2022

(54) SYSTEM, METHOD, AND COMPUTER PROGRAM PRODUCT FOR MOBILE DEVICE TRANSACTIONS

(71) Applicant: Visa International Service Association, San Francisco, CA (US)

(72) Inventors: Venkata Naga Pradeep Kumar Kaja, Foster City, CA (US); Vijayaraju Konkathi, Union City, CA (US)

(73) Assignee: Visa International Service Association, San Francisco, CA (US)

( * ) Notice: Subject to any disclaimer, the term of this patent is extended or adjusted under 35 U.S.C. 154(b) by 69 days.

(21) Appl. No.: 16/319,575

(22) PCT Filed: Aug. 21, 2018

(86) PCT No.: PCT/US2018/047256
§ 371 (c)(1),
(2) Date: Jan. 22, 2019

(87) PCT Pub. No.: WO2020/040743
PCT Pub. Date: Feb. 27, 2020

(65) Prior Publication Data
US 2020/0193410 A1    Jun. 18, 2020

(51) Int. Cl.
*G06Q 20/32* (2012.01)
*G06Q 20/20* (2012.01)
(Continued)

(52) U.S. Cl.
CPC ....... *G06Q 20/3227* (2013.01); *G06Q 20/202* (2013.01); *G06Q 20/322* (2013.01);
(Continued)

(58) Field of Classification Search
CPC ............. G06Q 20/3227; G06Q 20/202; G06Q 20/322; G06Q 20/3821; G06Q 20/3827;
(Continued)

(56) References Cited

U.S. PATENT DOCUMENTS

| | | | | |
|---|---|---|---|---|
| 6,035,398 | A * | 3/2000 | Bjorn | G06K 9/00006 713/186 |
| 10,440,014 | B1* | 10/2019 | Hoyer | H04L 63/0853 |
| 2009/0171827 | A1 | 7/2009 | Callahan et al. | |
| 2009/0287930 | A1* | 11/2009 | Nagaraja | H04L 9/08 |

(Continued)

FOREIGN PATENT DOCUMENTS

| WO | 2017102142 A1 | 6/2017 | |
|---|---|---|---|
| WO | WO-2017102142 A1 * | 6/2017 | ......... G06Q 20/3825 |

*Primary Examiner* — John W Hayes
*Assistant Examiner* — Taylor S Rak
(74) *Attorney, Agent, or Firm* — The Webb Law Firm

(57) ABSTRACT

Provided is a system, method, and computer program product for conducting a transaction with a mobile device. The method includes generating, on the mobile device, a limited use key based at least partially on at least one biometric input from a user, receiving, on the mobile device, transaction data from a point-of-sale system via a direct wireless communication with the mobile device, the transaction data corresponding to a transaction between the user and a merchant, generating, on the mobile device, a cryptogram based at least partially on the limited use key and the transaction data, and communicating, from the mobile device, the cryptogram to the point-of-sale system via the direct wireless communication.

14 Claims, 3 Drawing Sheets

(51) Int. Cl.
*G06Q 20/38* (2012.01)
*G06Q 20/40* (2012.01)
*H04L 9/32* (2006.01)

(52) U.S. Cl.
CPC ..... *G06Q 20/3821* (2013.01); *G06Q 20/3827* (2013.01); *G06Q 20/3829* (2013.01); *G06Q 20/40145* (2013.01); *H04L 9/3231* (2013.01); *G06Q 2220/00* (2013.01)

(58) Field of Classification Search
CPC ......... G06Q 20/3829; G06Q 20/40145; G06Q 2220/00; H04L 9/3231
See application file for complete search history.

(56) References Cited

U.S. PATENT DOCUMENTS

| | | | |
|---|---|---|---|
| 2011/0178933 A1* | 7/2011 | Bailey, Jr. | H04L 63/20 705/71 |
| 2014/0372308 A1* | 12/2014 | Sheets | G06Q 20/20 705/44 |
| 2015/0178724 A1 | 6/2015 | Ngo et al. | |
| 2016/0019539 A1* | 1/2016 | Hoyos | G06Q 20/40145 705/75 |
| 2016/0057619 A1 | 2/2016 | Lopez | |
| 2016/0092872 A1* | 3/2016 | Prakash | G06Q 20/3265 705/65 |
| 2017/0085563 A1 | 3/2017 | Royyuru | |
| 2018/0006821 A1 | 1/2018 | Kinagi | |
| 2019/0087815 A1* | 3/2019 | Goldschmidt | G06Q 20/20 |
| 2019/0095907 A1* | 3/2019 | Govindarajan | G06F 16/00 |

* cited by examiner

SYSTEM, METHOD, AND COMPUTER PROGRAM PRODUCT FOR MOBILE DEVICE TRANSACTIONS

CROSS-REFERENCE TO RELATED APPLICATION

This application is the United States national phase of International Application No. PCT/US2018/047256 filed Aug. 21, 2018, the disclosure of which is hereby incorporated by reference in its entirety.

BACKGROUND OF THE INVENTION

1. Field of the Invention

This invention relates generally to mobile device transactions and, in non-limiting embodiments, to a system, method, and computer program product for conducting and/or authenticating a transaction initiated with a mobile device.

2. Technical Considerations

To conduct a transaction, such as a payment with a merchant or a withdrawal from an automated teller machine (ATM), account holders often use an electronic payment method based on near-field communication (NFC) between a mobile device and a terminal. These methods require physical contact (or near physical proximity) between a mobile device and the terminal. These existing methods also require the mobile device to have network connectivity for exchanging necessary data with a remote server. In such existing methods, only once the mobile device is able to obtain a secret key from the server can the mobile device then generate a cryptogram based on the secret key for conducting the transaction. If the mobile device does not have an Internet connection, the secret key cannot be obtained and the transaction cannot be conducted.

Moreover, utilizing a network connection between a mobile device and a remote server to conduct a transaction poses security problems because sensitive account data is transmitted to and from the mobile device over a network. While existing methodologies use encryption for such communications, exposing even encrypted data to the Internet or other public networks poses security concerns.

Improvements to contactless payment systems often require modifications to merchant systems, such as merchant point-of-sale (POS) systems, including adoption and installation of specialized hardware and software. This technical limitation of merchant-controlled equipment often prevents smaller merchants from accepting new and innovative payment methods.

Accordingly, there is a need for a technically improved system and method for conducting a transaction with a mobile device that overcomes at least some of these problems.

SUMMARY OF THE INVENTION

According to a non-limiting embodiment, provided is a computer-implemented method for conducting a transaction with a mobile device, comprising: generating, on the mobile device, a limited use key based at least partially on at least one biometric input from a user; receiving, on the mobile device, transaction data from a point-of-sale system via a direct wireless communication with the mobile device, the transaction data corresponding to a transaction between the user and a merchant; generating, on the mobile device, a cryptogram based at least partially on the limited use key and the transaction data; and communicating, from the mobile device, the cryptogram to the point-of-sale system via the direct wireless communication.

In non-limiting embodiments, the mobile device is configured to generate the limited use key and generate the cryptogram while offline and independent of a network connection. In non-limiting embodiments, the transaction data comprises a transaction time, and wherein the cryptogram is generated based at least partially on the transaction time. In non-limiting embodiments, the cryptogram is generated based at least partially on a device identifier of the mobile device. In non-limiting embodiments, the at least one biometric input comprises at least one of the following: a spoken word or phrase, a fingerprint, a retina, an iris, a face, or any combination thereof. In non-limiting embodiments, the cryptogram is used by a transaction service provider to authenticate the transaction. In non-limiting embodiments, the method further comprises generating an account registration message comprising the at least one biometric input; and communicating the account registration message to an issuer system, wherein the account registration message is generated and communicated prior to generating the limited use key.

According to another non-limiting embodiment, provided is a system for conducting a transaction with a mobile device, comprising at least one processor of the mobile device, the at least one processor programmed or configured to: generate a limited use key based at least partially on at least one biometric input from a user; receive transaction data from a point-of-sale system via a direct wireless communication with the mobile device, the transaction data corresponding to a transaction between the user and a merchant; generate a cryptogram based at least partially on the limited use key and the transaction data; and communicate the cryptogram to the point-of-sale system via the direct wireless communication.

In non-limiting embodiments, the mobile device is configured to generate the limited use key and generate the cryptogram while offline and independent of a network connection. In non-limiting embodiments, the transaction data comprises a transaction time, and wherein the cryptogram is generated based at least partially on the transaction time. In non-limiting embodiments, the cryptogram is generated based at least partially on a device identifier of the mobile device. In non-limiting embodiments, the at least one biometric input comprises at least one of the following: a spoken word or phrase, a fingerprint, a retina, an iris, a face, or any combination thereof. In non-limiting embodiments, the cryptogram is used by a transaction service provider to authenticate the transaction. In non-limiting embodiments, the at least one processor is further programmed or configured to generate an account registration message comprising the at least one biometric input; and communicate the account registration message to an issuer system, wherein the account registration message is generated and communicated prior to generating the limited use key.

According to another non-limiting embodiment, provided is a computer program product for conducting a transaction with a mobile device, comprising at least one non-transitory computer-readable medium including program instructions that, when executed by at least one processor of the mobile device, cause the mobile device to: generate a limited use key based at least partially on at least one biometric input from a user; receive transaction data from a point-of-sale system via a direct wireless communication with the mobile device, the transaction data corresponding to a transaction between the user and a merchant; generate a cryptogram based at least partially on the limited use key and the transaction data; and communicate the cryptogram to the point-of-sale system via the direct wireless communication.

In non-limiting embodiments, the mobile device is configured to generate the limited use key and generate the cryptogram while offline and independent of a network connection. In non-limiting embodiments, the transaction data comprises a transaction time, and wherein the cryptogram is generated based at least partially on the transaction time. In non-limiting embodiments, the cryptogram is generated based at least partially on a device identifier of the mobile device. In non-limiting embodiments, the at least one biometric input comprises at least one of the following: a spoken word or phrase, a fingerprint, a retina, an iris, a face, or any combination thereof. In non-limiting embodiments, the cryptogram is used by a transaction service provider to authenticate the transaction. In non-limiting embodiments, the program instructions further cause the mobile device to generate an account registration message comprising the at least one biometric input; and communicate the account registration message to an issuer system, wherein the account registration message is generated and communicated prior to generating the limited use key.

According to another non-limiting embodiment, provided is a computer-implemented method for authenticating a transaction initiated with a mobile device, comprising: receiving, from a point-of-sale system associated with a merchant, a cryptogram, an account identifier, and transaction data corresponding to a transaction between a user of the mobile device and the point-of-sale system, the cryptogram generated by the mobile device based on a limited use key, the limited use key generated by the mobile device based on at least one biometric input of the user; retrieving, with at least one processor, stored biometric data corresponding to the account identifier; generating, with at least one processor, a recreated limited use key based at least partially on the stored biometric data; generating, with at least one processor, a recreated cryptogram based at least partially on the recreated limited use key; comparing, with at least one processor, the recreated cryptogram to the cryptogram received from the point-of-sale system; in response to determining that the recreated cryptogram matches the cryptogram received from the point-of-sale system, authenticating the transaction with at least one processor.

In non-limiting embodiments, at least one processor of a transaction service provider system generates the recreated limited use key, generates the recreated cryptogram, and compares the recreated cryptogram to the cryptogram received from the point-of-sale system. In non-limiting embodiments, the transaction data comprises a transaction time, and wherein the recreated cryptogram is generated based at least partially on the transaction time. In non-limiting embodiments, the recreated cryptogram is generated based at least partially on a device identifier of the mobile device. In non-limiting embodiments, the at least one biometric input comprises at least one of the following: a spoken word or phrase, a fingerprint, a retina, an iris, a face, or any combination thereof.

According to another non-limiting embodiment, provided is a system for authenticating a transaction initiated with a mobile device, comprising: at least one data storage device comprising account data for a plurality of accounts, the account data for each account of the plurality of accounts comprising biometric data and at least one account identifier; a transaction processing server comprising at least one processor, the transaction processing server in communication with the at least one data storage device and a plurality of merchant systems, the transaction processing server configured to: receive, from a point-of-sale system associated with a merchant, a cryptogram, an account identifier, and transaction data corresponding to a transaction between a user of the mobile device and the point-of-sale system, the cryptogram generated by the mobile device based on a limited use key, the limited use key generated by the mobile device based on at least one biometric input of the user; retrieve stored biometric data corresponding to the account identifier from the at least one data storage device; generate a recreated limited use key based at least partially on the stored biometric data; generate a recreated cryptogram based at least partially on the recreated limited use key; compare the recreated cryptogram to the cryptogram received from the point-of-sale system; in response to determining that the recreated cryptogram matches the cryptogram received from the point-of-sale system, authenticate the transaction.

In non-limiting embodiments, the transaction data comprises a transaction time, and wherein the recreated cryptogram is generated based at least partially on the transaction time. In non-limiting embodiments, the recreated cryptogram is generated based at least partially on a device identifier of the mobile device. In non-limiting embodiments, the at least one biometric input comprises at least one of the following: a spoken word or phrase, a fingerprint, a retina, an iris, a face, or any combination thereof.

According to another non-limiting embodiment, provided is a computer program product for authenticating a transaction initiated with a mobile device, comprising at least one non-transitory computer-readable medium including program instructions that, when executed by at least one processor, cause the at least one processor to: receive, from a point-of-sale system associated with a merchant, a cryptogram, an account identifier, and transaction data corresponding to a transaction between a user of the mobile device and the point-of-sale system, the cryptogram generated by the mobile device based on a limited use key, the limited use key generated by the mobile device based on at least one biometric input of the user; retrieve stored biometric data corresponding to the account identifier from at least one data storage device; generate a recreated limited use key based at least partially on the stored biometric data; generate a recreated cryptogram based at least partially on the recreated limited use key; compare the recreated cryptogram to the cryptogram received from the point-of-sale system; in response to determining that the recreated cryptogram matches the cryptogram received from the point-of-sale system, authenticate the transaction.

Further preferred and non-limiting embodiments or aspects are set forth in the following numbered clauses.

Clause 1: A computer-implemented method for conducting a transaction with a mobile device, comprising: generating, on the mobile device, a limited use key based at least partially on at least one biometric input from a user; receiving, on the mobile device, transaction data from a point-of-sale system via a direct wireless communication with the mobile device, the transaction data corresponding to a transaction between the user and a merchant; generating, on the mobile device, a cryptogram based at least partially on the limited use key and the transaction data; and communicating, from the mobile device, the cryptogram to the point-of-sale system via the direct wireless communication.

Clause 2: The computer-implemented method of clause 1, wherein the mobile device is configured to generate the limited use key and generate the cryptogram while offline and independent of a network connection.

Clause 3: The computer-implemented method of clauses 1 or 2, wherein the transaction data comprises a transaction time, and wherein the cryptogram is generated based at least partially on the transaction time.

Clause 4: The computer-implemented method of any of clauses 1-3, wherein the cryptogram is generated based at least partially on a device identifier of the mobile device.

Clause 5: The computer-implemented method of any of clauses 1-4, wherein the at least one biometric input comprises at least one of the following: a spoken word or phrase, a fingerprint, a retina, an iris, a face, or any combination thereof.

Clause 6: The computer-implemented method of any of clauses 1-5, wherein the cryptogram is used by a transaction service provider to authenticate the transaction.

Clause 7: The computer-implemented method of any of clauses 1-6, further comprising: generating an account registration message comprising the at least one biometric input; and communicating the account registration message to an issuer system, wherein the account registration message is generated and communicated prior to generating the limited use key.

Clause 8: A system for conducting a transaction with a mobile device, comprising at least one processor of the mobile device, the at least one processor programmed or configured to: generate a limited use key based at least partially on at least one biometric input from a user; receive transaction data from a point-of-sale system via a direct wireless communication with the mobile device, the transaction data corresponding to a transaction between the user and a merchant; generate a cryptogram based at least partially on the limited use key and the transaction data; and communicate the cryptogram to the point-of-sale system via the direct wireless communication.

Clause 9: The system of clause 8, wherein the mobile device is configured to generate the limited use key and generate the cryptogram while offline and independent of a network connection.

Clause 10: The system of clauses 8 or 9, wherein the transaction data comprises a transaction time, and wherein the cryptogram is generated based at least partially on the transaction time.

Clause 11: The system of any of clauses 8-10, wherein the cryptogram is generated based at least partially on a device identifier of the mobile device.

Clause 12: The system of any of clauses 8-11, wherein the at least one biometric input comprises at least one of the following: a spoken word or phrase, a fingerprint, a retina, an iris, a face, or any combination thereof.

Clause 13: The system of any of clauses 8-12, wherein the cryptogram is used by a transaction service provider to authenticate the transaction.

Clause 14: The system of any of clauses 8-13, wherein the at least one processor is further programmed or configured to: generate an account registration message comprising the at least one biometric input; and communicate the account registration message to an issuer system, wherein the account registration message is generated and communicated prior to generating the limited use key.

Clause 15: A computer program product for conducting a transaction with a mobile device, comprising at least one non-transitory computer-readable medium including program instructions that, when executed by at least one processor of the mobile device, cause the mobile device to: generate a limited use key based at least partially on at least one biometric input from a user; receive transaction data from a point-of-sale system via a direct wireless communication with the mobile device, the transaction data corresponding to a transaction between the user and a merchant; generate a cryptogram based at least partially on the limited use key and the transaction data; and communicate the cryptogram to the point-of-sale system via the direct wireless communication.

Clause 16: The computer program product of clause 15, wherein the mobile device is configured to generate the limited use key and generate the cryptogram while offline and independent of a network connection.

Clause 17: The computer program product of clauses 15 or 16, wherein the transaction data comprises a transaction time, and wherein the cryptogram is generated based at least partially on the transaction time.

Clause 18: The computer program product of any of clauses 15-17, wherein the cryptogram is generated based at least partially on a device identifier of the mobile device.

Clause 19: The computer program product of any of clauses 15-18, wherein the at least one biometric input comprises at least one of the following: a spoken word or phrase, a fingerprint, a retina, an iris, a face, or any combination thereof.

Clause 20: The computer program product of any of clauses 15-19, wherein the program instructions further cause the mobile device to: generate an account registration message comprising the at least one biometric input; and communicate the account registration message to an issuer system, wherein the account registration message is generated and communicated prior to generating the limited use key.

Clause 21: A computer-implemented method for authenticating a transaction initiated with a mobile device, comprising: receiving, from a point-of-sale system associated with a merchant, a cryptogram, an account identifier, and transaction data corresponding to a transaction between a user of the mobile device and the point-of-sale system, the cryptogram generated by the mobile device based on a limited use key, the limited use key generated by the mobile device based on at least one biometric input of the user; retrieving, with at least one processor, stored biometric data corresponding to the account identifier; generating, with at least one processor, a recreated limited use key based at least partially on the stored biometric data; generating, with at least one processor, a recreated cryptogram based at least partially on the recreated limited use key; comparing, with at least one processor, the recreated cryptogram to the cryptogram received from the point-of-sale system; and in response to determining that the recreated cryptogram matches the cryptogram received from the point-of-sale system, authenticating the transaction with at least one processor.

Clause 22: The computer-implemented method of clause 21, wherein at least one processor of a transaction service provider system generates the recreated limited use key, generates the recreated cryptogram, and compares the recreated cryptogram to the cryptogram received from the point-of-sale system.

Clause 23: The computer-implemented method of clauses 21 or 22, wherein the transaction data comprises a transaction time, and wherein the recreated cryptogram is generated based at least partially on the transaction time.

Clause 24: The computer-implemented method of any of clauses 21-23, wherein the recreated cryptogram is generated based at least partially on a device identifier of the mobile device.

Clause 25: The computer-implemented method of any of clauses 21-24, wherein the at least one biometric input comprises at least one of the following: a spoken word or phrase, a fingerprint, a retina, an iris, a face, or any combination thereof.

Clause 26: A system for authenticating a transaction initiated with a mobile device, comprising: at least one data storage device comprising account data for a plurality of accounts, the account data for each account of the plurality of accounts comprising biometric data and at least one account identifier; and a transaction processing server comprising at least one processor, the transaction processing server in communication with the at least one data storage device and a plurality of merchant systems, the transaction processing server configured to: receive, from a point-of-sale system associated with a merchant, a cryptogram, an account identifier, and transaction data corresponding to a transaction between a user of the mobile device and the point-of-sale system, the cryptogram generated by the mobile device based on a limited use key, the limited use key generated by the mobile device based on at least one biometric input of the user; retrieve stored biometric data corresponding to the account identifier from the at least one data storage device; generate a recreated limited use key based at least partially on the stored biometric data; generate a recreated cryptogram based at least partially on the recreated limited use key; compare the recreated cryptogram to the cryptogram received from the point-of-sale system; and in response to determining that the recreated cryptogram matches the cryptogram received from the point-of-sale system, authenticate the transaction.

Clause 27: The system of clause 26, wherein the transaction data comprises a transaction time, and wherein the recreated cryptogram is generated based at least partially on the transaction time.

Clause 28: The system of clauses 26 or 27, wherein the recreated cryptogram is generated based at least partially on a device identifier of the mobile device.

Clause 29: The system of any of clauses 26-28, wherein the at least one biometric input comprises at least one of the following: a spoken word or phrase, a fingerprint, a retina, an iris, a face, or any combination thereof.

Clause 30: A computer program product for authenticating a transaction initiated with a mobile device, comprising at least one non-transitory computer-readable medium including program instructions that, when executed by at least one processor, cause the at least one processor to: receive, from a point-of-sale system associated with a merchant, a cryptogram, an account identifier, and transaction data corresponding to a transaction between a user of the mobile device and the point-of-sale system, the cryptogram generated by the mobile device based on a limited use key, the limited use key generated by the mobile device based on at least one biometric input of the user; retrieve stored biometric data corresponding to the account identifier from at least one data storage device; generate a recreated limited use key based at least partially on the stored biometric data; generate a recreated cryptogram based at least partially on the recreated limited use key; compare the recreated cryptogram to the cryptogram received from the point-of-sale system; and in response to determining that the recreated cryptogram matches the cryptogram received from the point-of-sale system, authenticate the transaction.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
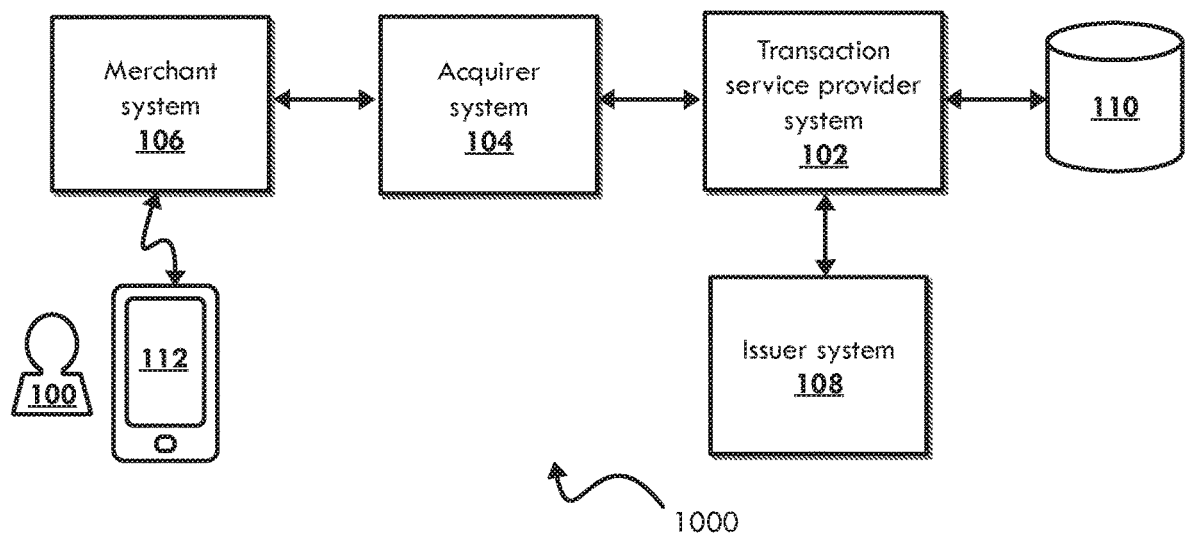
FIG. 1 is a schematic diagram of a system for conducting a transaction with a mobile device according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures.

However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "acquirer institution" may refer to an entity licensed by the transaction service provider and approved by the transaction service provider to originate transactions using a portable financial device of the transaction service provider. The transactions may include original credit transactions (OCTs) and account funding transactions (AFTs). The acquirer institution may be authorized by the transaction service provider to originate transactions using a portable financial device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a PDA, a security card, an access card, a wireless terminal, and/or a transponder, as examples. The portable financial device may include a volatile or a non-volatile memory to store information, such as an account identifier or a name of the account holder.

As used herein, the term "biometric input" may refer to any type of biometric provided by a user such as, but not limited to, one or more of the following: a fingerprint, a retinal image, an iris image, a facial image, a hand geometry image, a verbal statement, response, or utterance, a physiologic indicator, a DNA sample, a signature, and/or the like. The term "biometric input device," as used herein, may refer to one or more devices and/or systems for receiving and/or providing a biometric input. As an example, a biometric input device may include one or more of the following: a fingerprint scanner, a retina and/or iris scanner, a camera, a microphone, a sensor, a touchscreen, and/or the like.

Non-limiting embodiments of the present invention are directed to a system, method, and apparatus for conducting a transaction with a mobile device that provides enhanced security and solves technical limitations of existing mobile device payment methods. For example, in non-limiting embodiments, a user may conduct a transaction using a mobile device at a physical terminal (such as a merchant POS system) without having an Internet connection to communicate with a remote server. Thus, these non-limiting embodiments can facilitate a payment to occur at a merchant location with limited network connectivity, such as a remote rural location or an internal building location shielded from wireless signals. Moreover, non-limiting embodiments involve the generation of a limited use key on the mobile device itself, as opposed to existing methods in which a server generates a limited use key and provisions the limited use key to the mobile device. Generating the limited use key on the mobile device provides for enhanced security and further limits the need for the mobile device to communicate with a remote server. Additionally, non-limiting embodiments are implemented on a mobile device and/or transaction processing system without requiring hardware and/or software modification to a merchant POS system, thereby allowing for more efficient updates, processing, and access. It will be appreciated by those skilled in the art that non-limiting embodiments provide additional technical benefits and efficiencies.

Referring now to FIG. 1, a system 1000 for conducting a transaction with a mobile device 112 is shown according to a non-limiting embodiment. A user 100 possesses the mobile device 112 and seeks to conduct a transaction with a merchant system 106. The merchant system 106 is in communication with an acquirer system 104, transaction processing system 102, and/or issuer system 108. In the system 1000 shown in FIG. 1, the merchant system 106 is in communication with the transaction processing system 102 via an acquirer system 104. It will be appreciated, however, that various other arrangements are possible and that an acquirer system 104 may not be used. For example, the merchant system 106 may be in communication with the transaction processing system 102 directly and/or through a payment gateway.

Still referring to FIG. 1, the transaction processing system 102 is also in communication with a data storage device 110. The data storage device 110 may include one or more physical storage devices local or remote to the transaction processing system 102 and/or issuer system 108, such as one or more account databases. The data storage device 110 may store thereon account data for each of a plurality of account holders, such as one or more account identifiers, account holder identifiers, biometric data, contact information, and/or the like. The account data may be provided by a user 100 during an application process with an issuer institution associated with issuer system 108. As an example, a user 100 may provide biometric data in the form of one or more biometric inputs to an issuer system 108 when creating a new account or at any time subsequent to the creation of an account. The user 100 may provide the biometric data through the user's mobile device 112 or, in other examples, may provide the biometric data at a physical location such as an issuer institution, kiosk, and/or the like.

With continued reference to FIG. 1, the system 1000 allows for the mobile device 112 to conduct a transaction with the merchant system 106 without a network connection. For example, the mobile device 112 does not need to communicate with the acquirer system 104, transaction processing system 102, or issuer system 108 to conduct the transaction. The mobile device 112 may communicate with the merchant system 106 through any form of communication such as, for example, Near-Field Communication (NFC), Bluetooth®, RFID, and/or the like. In non-limiting embodiments, a wireless communication between the mobile device 112 and the merchant system 106 may be a direct communication enabled through the proximity between respective antennae of the mobile device 112 and the merchant system 106. In some non-limiting embodiments, the mobile device 112 and merchant system 106 may communicate through an exchange of audio data, visual data (e.g., machine-readable indicia such as barcodes), and/or the like, utilizing a display, microphone, speaker, and/or camera unit of the mobile device 112 and/or merchant system 106. In further non-limiting embodiments, the mobile device 112 may communicate with the merchant system 106 through a hardwired connection, such as a USB cable or audio cable.

In the non-limiting embodiment shown in FIG. 1, the mobile device 112 may store a token that was provided to the mobile device 112 during provisioning of a payment account and/or portable financial device to a user. The token may be generated by the transaction processing system 102 and/or issuer system 108 based on an account identifier. The token may be provisioned to the mobile device 112, such as to an electronic wallet on the mobile application executing on the mobile device 112. The electronic wallet application may facilitate communication between the mobile device 112 and the merchant system 106 and/or other aspects of initiating and conducting the transaction. During provisioning of the token to the mobile device 112, the transaction processing system 102, issuer system 108, or some other system or device may also collect one or more biometric inputs from the user for storage in the data storage device 110.

Still referring to FIG. 1, in some examples the user 100 may approach the merchant system 106 at a physical retail store to make a purchase. Either the mobile device 112 or merchant system 106 may initiate a communication. The user 100 provides one or more biometric inputs to the mobile device 112, such as scanning a fingerprint, taking an image of the user's face, capturing audio data, and/or the like.

The mobile device 112 then, independent of the merchant system 106 or any other external system, generates a limited use key based at least partially on the biometric input. The limited use key may also be based on other inputs to a key generation algorithm, such as a random value, a seed value, user data, account data, device data (e.g., device identifier, etc.), time of day, one or more certificates generated by an issuer system 108, and/or the like. The limited use key may have an expiration period, such as one to several minutes. The expiration period may be configurable and may differ depending on the issuer institution corresponding to the account, an account type, or other considerations. Accordingly, because the limited use key in some non-limiting embodiments is used to generate a cryptogram that is recreated by the transaction processing system 102 to authenticate the transaction, the transaction may have to be conducted within the time period in order to be successfully completed.

Still referring to FIG. 1, during the communication with the merchant system 106, the mobile device 112 receives transaction data from the merchant system 106 concerning the requested transaction. The transaction data may include, for example, a transaction value, a transaction time, a transaction date, account data (e.g., an account identifier, token, user identifier, etc.), a merchant identifier (e.g., a Merchant Category Code or the like), an issuer identifier (e.g., a BIN or the like), a device identifier of the mobile device 112, a currency for the transaction, a country code, and/or other information regarding the transaction. In some non-limiting embodiments, the transaction data comprises a Processing Options Data Object List (PDOL). The transaction data may be received by the mobile device 112 prior to or after the mobile device 112 generates the limited use key. The limited use key may be generated by the mobile device in any manner, such as but not limited to applying one or more hash or encryption algorithms to the biometric input and/or other input data.

In some non-limiting examples in which the mobile device 112 has access to a network connection, the mobile device 112 may securely communicate with the transaction processing system 102 through use of a session key derived from a secret possessed by both the user 100 and the transaction processing system 102, such as a biometric input, password, PIN, and/or the like. Using this session key, the transaction processing system 102 may encrypt key derivation parameters and communicate the parameters to the mobile device 112 such that the mobile device 112 can decrypt the parameters and generate the cryptogram. It will be appreciated that other implementations are possible.

With continued reference to FIG. 1, once the mobile device 112 has generated a limited use key and received transaction data, the mobile device 112 generates a cryptogram. A cryptogram may include any form of encrypted data, such as an encrypted string of alphanumeric characters. The mobile device 112 retrieves the generated limited use key from local memory and one or more transaction parameters from the transaction data. Based on these inputs, the mobile device 112 generates a cryptogram by, for example, applying one or more hash and/or encryption algorithms to the inputs. In a non-limiting embodiment, the mobile device 112 generates a cryptogram by hashing or combining the limited use key, PDOL data (including transaction parameters such as a transaction time), and a token corresponding to the account. It will be appreciated, however, that various inputs may be used to generate a cryptogram unique to the transaction and the limited use key. The mobile device 112 then communicates the generated cryptogram to the merchant system 106.

Still referring to FIG. 1, the merchant system 106, in response to receiving the cryptogram from the mobile device 112, communicates with the acquirer system 104, transaction processing system 102, and/or a payment gateway to authorize the transaction. The merchant system 106 may communicate the cryptogram in an authorization request message (e.g., embedded in or attached to an authorization request message) or in a separate communication. Once the transaction processing system 102 receives the cryptogram and the transaction data relating to the transaction, the transaction processing system 102 begins to authorize the transaction by recreating the limited use key and cryptogram. The transaction processing system 102 identifies the user 100 based on a user identifier, account identifier, and/or the like, and retrieves biometric data associated with the user 100 from the data storage device 110. Using the retrieved biometric data and any other inputs used by the mobile device 112 to generate the limited use key, the transaction processing system 102 generates a recreated limited use key. Because the limited use key may expire after a time period, the recreated limited use key may only match the original limited use key if the transaction is conducted within that time period. Then, based on the recreated limited use key and the transaction parameters of the transaction data used by the mobile device 112 to generate the cryptogram, the transaction processing system 102 generates a recreated cryptogram.

With continued reference to FIG. 1, the transaction processing system 102 compares the recreated cryptogram to the cryptogram received from the mobile device 112 to determine if they match. In response to determining that the cryptograms match, the transaction processing system continues processing the transaction. For example, the transaction processing system 102 may continue processing the transaction by generating an authorization request message (e.g., an Open Authorization (OAuth) message or other type of authorization request message) and communicate the authorization request message to the issuer system 108. In response, the issuer system 108 returns an authorization response message to the transaction processing system 102 approving or denying the transaction. In response to determining that the cryptograms do not match, the transaction processing system 102 may return a transaction response message to the merchant system 106 and/or acquirer system 104 denying the transaction request.

Figure 2:
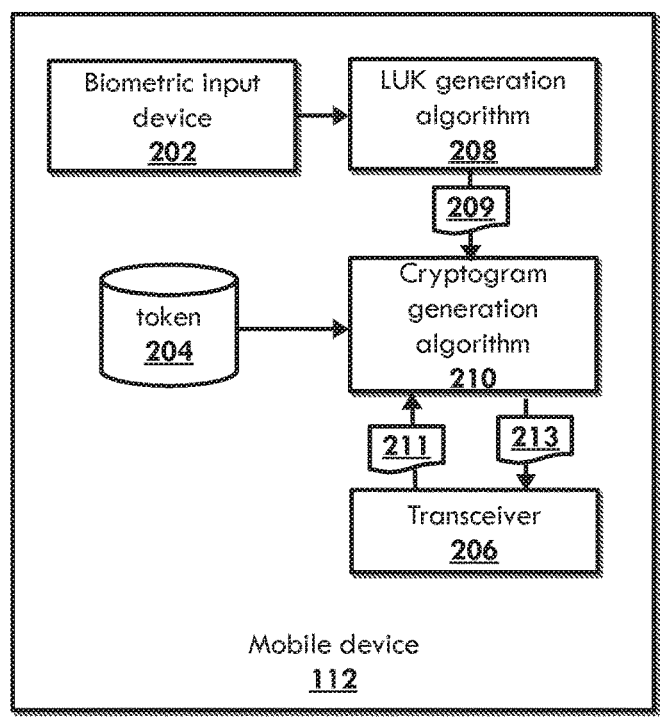
FIG. 2 is a schematic diagram of a mobile device according to a non-limiting embodiment.

Referring now to FIG. 2, a mobile device 112 is shown according to a non-limiting embodiment. The mobile device 112 includes one or more processors (not shown in FIG. 2), a biometric input device 202, a data storage device 204 storing a token, a transceiver 206, a limited use key generation algorithm 208, and a cryptogram generation algorithm 210. The limited use key generation algorithm 208 and the cryptogram generation algorithm 210 may include one or more software routines provided by a software application, such as an electronic wallet application, executing on the mobile device 112. It will be appreciated that the limited use key generation algorithm 208 and the cryptogram generation algorithm 210 may also be provided in the form of firmware embedded on a chip or standalone software applications that are invoked from another software application, such as an electronic wallet application or mobile operating system. The transceiver 206 may include one or more antennae for communicating radio signals with external devices and systems. The transceiver 206 may also include an NFC chip, Bluetooth® chip, and/or other integrated circuits for communicating with external systems and devices using one or more communication protocols.

With continued reference to FIG. 2, in non-limiting embodiments, the limited use key generation algorithm 208 accepts, as input, one or more biometric inputs received from the biometric input device 202 and other inputs, such as but not limited to a random value, a seed value, user data, account data, device data (e.g., device identifier, etc.), time of day, one or more certificates generated by an issuer system 108, and/or the like. The limited use key generation algorithm 208 then generates and outputs a limited use key 209 which is inputted to the cryptogram generation algorithm 210. The cryptogram generation algorithm 210 may also receive other inputs, such as a token stored on the data storage device 204 and/or transaction data 211 (e.g., such as PDOL data) received by the transceiver 206 from a merchant POS system (not shown in FIG. 2). The cryptogram generation algorithm 210, based on these inputs, outputs a cryptogram 213 which is communicated by the transceiver 206 to a merchant POS system. In non-limiting embodiments, the cryptogram generation algorithm 210 generates the cryptogram by hashing or combining the limited use key, a transaction time, and a token corresponding to the account. It will be appreciated that the architecture of the mobile device 112 may be arranged in various ways.

Figure 3:
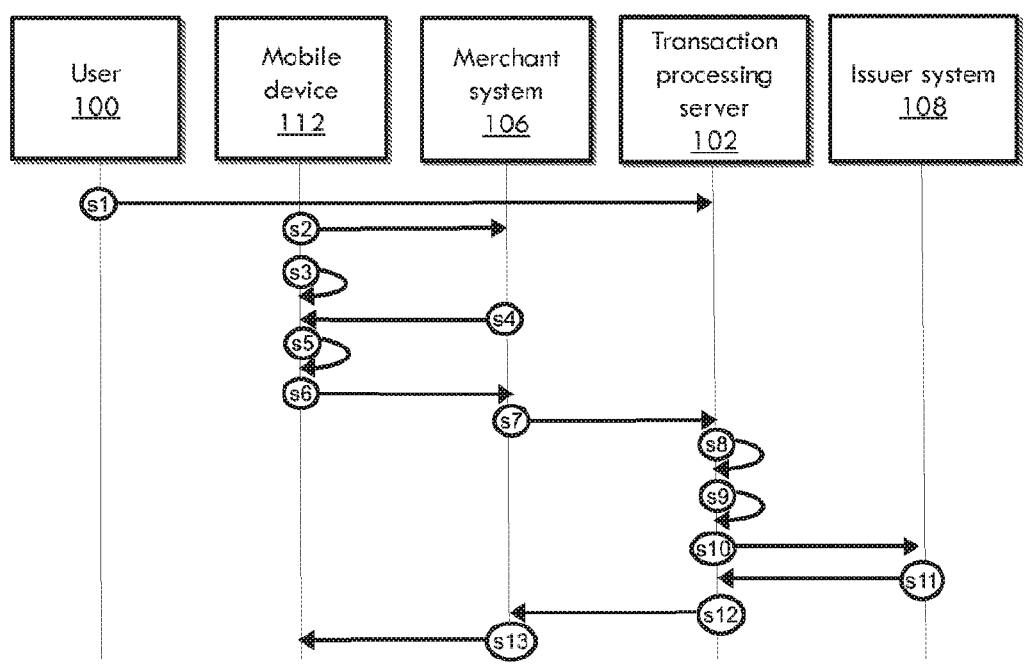
FIG. 3 is a sequence diagram of a method for conducting a transaction with a mobile device according to a non-limiting embodiment.

Referring now to FIG. 3, a sequence diagram is shown for conducting a transaction with an offline mobile device according to a non-limiting embodiment. It will be appreciated that the sequence and steps shown in FIG. 3 are for example only and that various other sequences, orders, and steps may be used. At a first step s1, a user 100 provides user data to the transaction processing system 102 and/or issuer system 108. The user data may be provided as part of an account registration process or at any other time. The user data may include, for example, a user's name, address, telephone number, and one or more biometric inputs. The transaction processing system 102 and/or issuer system 108 may provision one or more tokens to the mobile device 112 of the user 100 during such a process (steps not shown in FIG. 3).

At step s2 of FIG. 3, a communication is established between the mobile device 112 and the merchant system 106. As explained herein, either the mobile device 112 or merchant system 106 may initiate the communication. At step s3, the mobile device 112, independent of the merchant system 106 or any other external system, generates a limited use key based on a biometric input and/or other inputs, such as a random value, a seed value, user data, account data, device data (e.g., device identifier, etc.), time of day, one or more certificates generated by an issuer system 108, and/or the like. At step s4, the mobile device 112 receives transaction data from the merchant system 106 concerning the requested transaction. The transaction data may include, for example, a transaction value, a transaction time, a transaction date, account data (e.g., an account identifier, token, user identifier, etc.), a merchant identifier (e.g., a Merchant Category Code or the like), an issuer identifier (e.g., a BIN or the like), a device identifier of the mobile device 112, a currency for the transaction, a country code, and/or other information regarding the transaction. In some non-limiting embodiments, the transaction data comprises a Processing Options Data Object List (PDOL). Step s4 may occur before or after step s3.

At step s5 of FIG. 3, the mobile device 112 generates a cryptogram based on the limited use key generated at step s3 and one or more transaction parameters from the transaction data received at step s4. In a non-limiting embodiment, the mobile device 112 generates a cryptogram by hashing or combining the limited use key, a transaction time, and a token corresponding to the account. At step s6, the mobile device 112 communicates the cryptogram to the merchant system 106.

Still referring to FIG. 3, the merchant system 106, in response to receiving the cryptogram from the mobile device 112, requests for the transaction to be authorized at step s7. In particular, the merchant system 106 communicates the cryptogram and other transaction data to the transaction processing system 102 in one or more messages. As explained herein, the merchant system 106 may instead communicate a message to an acquirer system or payment gateway (not shown in FIG. 3) which, in turn, communicates the message to the transaction processing system 102. At step s8, the transaction processing system 102 recreates the limited use key and cryptogram. For example, the transaction processing system 102 may identify the user 100 based on a user identifier, account identifier, and/or the like, and retrieve biometric data associated with the user 100. Using the retrieved biometric data and any other inputs used by the mobile device 112 to generate the limited use key, the transaction processing system 102 generates a recreated limited use key. Then, based on the recreated limited use key and the transaction parameters of the transaction data used by the mobile device 112 to generate the cryptogram, the transaction processing system 102 generates a recreated cryptogram. At step s9, the transaction processing system 102 compares the recreated cryptogram to the cryptogram it received at step s7.

With continued reference to FIG. 3, if the transaction processing system 102 determines that the recreated cryptogram matches the received cryptogram at step s9, at step s10 the transaction processing system 102 may generate an authorization request message and communicate the authorization request message to the issuer system 108. At step s11, the issuer system 108 communicates an authorization response message approving or denying the transaction to the transaction processing system. At step s12, the transaction processing system 102 communicates an authorization response message to the merchant system 106 indicating that the transaction is authorized or not authorized. For example, the authorization response message may include an additional field having a flag or other indicator. At step s13, the merchant system 106 communicates with the mobile device 112 to inform the user 100 that the transaction was approved or denied.

Figure 4:
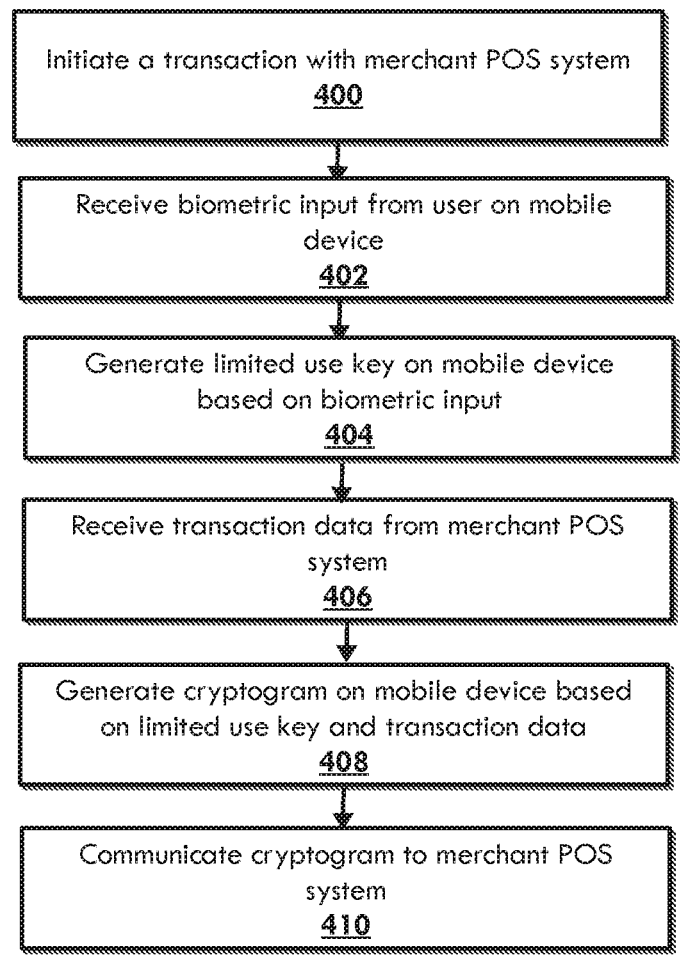
FIG. 4 is a flow diagram of a method for conducting a transaction with a mobile device according to a non-limiting embodiment.

Referring now to FIG. 4, shown is a flow diagram for a method for conducting a transaction with an offline mobile device according to a non-limiting embodiment. The method shown in FIG. 4 may be performed by a mobile device using software and/or hardware of the mobile device. In some non-limiting embodiments, an electronic wallet application and/or mobile device operating system may perform some or all of the steps shown in FIG. 4. At step 400, the mobile device initiates a transaction with a merchant system, such as a merchant POS system. As an example, a user may present a mobile device to a merchant POS system having a transceiver such that the mobile device can detect signals from the transceiver and/or emit signals that are recognized by the transceiver. As explained herein, either the mobile device or merchant POS system may initiate the communication. At step 402, a user provides a biometric input to the mobile device. As an example, a user may input a fingerprint, image data, or voice data to the mobile device. As explained here, in some non-limiting embodiments, instead of a biometric input, another input may be used such as a password or PIN.

With continued reference to FIG. 4, at step 404, the mobile device generates a limited use key based at least partially on the biometric input received at step 402. As explained herein, the limited use key may be generated in several different ways and based on several different inputs. At step 406, transaction data may be received by the mobile device from the merchant POS system via the communication established at step 400. At step 408, after generating the limited use key and receiving the transaction data in any order, the mobile device generates a cryptogram based at least partially on the limited use key and the transaction data. As explained herein, the cryptogram may be generated by hashing and/or encrypting the limited use key with one or more parameters of the transaction data and/or other inputs. At step 410, the mobile device communicates the cryptogram to the merchant POS system via the communication established at step 400. In this manner, the mobile device does not require a network connection and only needs to communicate locally with the merchant POS system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for conducting a transaction with a mobile device, comprising:
   generating, by the mobile device, a limited use key based at least partially on at least one biometric input from a user by hashing the at least one biometric input, wherein the mobile device generates the limited use key while offline, and wherein data associated with the at least one biometric input is stored on a data storage device;
   receiving, by the mobile device, transaction data from a point-of-sale system via a wireless communication with the mobile device, the transaction data corresponding to a transaction between the user and a merchant, wherein the transaction data comprises at least one user identifier and a token corresponding to an account identifier;
   generating, by the mobile device, a cryptogram based at least partially on the limited use key, the token corresponding to the account identifier, and a device identifier of the mobile device by hashing at least the limited use key and the token corresponding to the account identifier, wherein the mobile device generates the cryptogram while offline;
   communicating, by the mobile device, the cryptogram to the point-of-sale system via the wireless communication;
   receiving, by a transaction processing system, the cryptogram and the transaction data from the point-of-sale system;
   identifying, by the transaction processing system, the user based on the at least one user identifier;
   searching, by the transaction processing system, the data storage device for data associated with the at least one biometric input from the user;
   retrieving, by the transaction processing system, stored biometric data associated with the user and used by the mobile device to generate the limited use key from the data storage device;
   generating, by the transaction processing system, a recreated limited use key based on stored biometric data associated with the user;
   generating, by the transaction processing system, a recreated cryptogram based at least partially on the recreated limited use key and the transaction data corresponding to the transaction between the user and the merchant;
   comparing, by the transaction processing system, the recreated cryptogram and the cryptogram received from the mobile device;
   determining, by the transaction processing system, whether the recreated cryptogram matches the cryptogram received from the mobile device; and
   in response to determining that the recreated cryptogram matches the cryptogram received by the point-of-sale system from the mobile device, generating an authorization request message and communicating the authorization request message to an issuer system.

2. The computer-implemented method of claim 1, wherein the transaction data comprises a transaction time, and wherein the cryptogram is generated based at least partially on the transaction time.

3. The computer-implemented method of claim 1, wherein the at least one biometric input comprises at least one of the following: a spoken word or phrase, a fingerprint, a retina, an iris, a face, or any combination thereof.

4. The computer-implemented method of claim 1, further comprising authenticating the transaction using the cryptogram.

5. The computer-implemented method of claim 1, further comprising:
   generating, by the mobile device, an account registration message comprising the at least one biometric input; and
   communicating, by the mobile device, the account registration message to the issuer system, wherein the account registration message is generated and communicated prior to generating the limited use key.

6. A system for conducting a transaction with a mobile device, comprising:
   a mobile device including at least one processor programmed or configured to:
      generate a limited use key based at least partially on at least one biometric input from a user by hashing the at least one biometric input, wherein the limited use key is generated while offline, and wherein data associated with the at least one biometric input is stored on a data storage device;
      receive transaction data from a point-of-sale system via a wireless communication with the mobile device, the transaction data corresponding to a transaction between the user and a merchant, wherein the transaction data comprises at least one user identifier and a token corresponding to an account identifier;
      generate a cryptogram based at least partially on the limited use key, the token corresponding to the account identifier, and a device identifier of the mobile device by hashing at least the limited use key and the token corresponding to the account identifier, wherein the cryptogram is generated while offline; and
      communicate the cryptogram to the point-of-sale system via the wireless communication; and
   at least one server computer in communication with the point-of-sale system, the at least one server computer including at least one processor programmed or configured to:
      receive the cryptogram and the transaction data from the point-of-sale system;
      identify the user based on the at least one user identifier;
      search the data storage device for data associated with the at least one biometric input from the user;
      retrieve stored biometric data associated with the user and used by the mobile device to generate the limited use key from the data storage device;
      generate a recreated limited use key based on stored biometric data associated with the user;
      generate a recreated cryptogram based at least partially on the recreated limited use key and the transaction data corresponding to the transaction between the user and the merchant;
      compare the recreated cryptogram and the cryptogram received from the mobile device;
      determine whether the recreated cryptogram matches the cryptogram received from the mobile device; and in response to determining that the recreated cryptogram matches the cryptogram received by the point-of-sale system from the mobile device, generate an authorization request message and communicate the authorization request message to an issuer system.

7. The system of claim 6, wherein the transaction data comprises a transaction time, and wherein the cryptogram is generated based at least partially on the transaction time.

8. The system of claim 6, wherein the at least one biometric input comprises at least one of the following: a spoken word or phrase, a fingerprint, a retina, an iris, a face, or any combination thereof.

9. The system of claim 6, wherein the at least one server computer authenticates the transaction using the cryptogram.

10. The system of claim 6, wherein the at least one processor of the at least one server computer is further programmed or configured to:
generate an account registration message comprising the at least one biometric input; and
communicate the account registration message to the issuer system, wherein the account registration message is generated and communicated prior to generating the limited use key.

11. A computer program product for conducting a transaction with a mobile device, comprising:
a first non-transitory computer-readable medium including program instructions that, when executed by at least one mobile device processor, cause the at least one mobile device processor to perform operations comprising:
generating a limited use key based at least partially on at least one biometric input from a user by hashing the at least one biometric input, wherein the limited use key is generated while offline, and wherein data associated with the at least one biometric input is stored on a data storage device;
receiving transaction data from a point-of-sale system via a wireless communication with the point-of-sale system, the transaction data corresponding to a transaction between the user and a merchant, wherein the transaction data comprises at least one user identifier and a token corresponding to an account identifier;
generating a cryptogram based at least partially on the limited use key, the token corresponding to the account identifier, and a device identifier of the mobile device by hashing at least the limited use key and the token corresponding to the account identifier, wherein the cryptogram is generated while offline; and
communicating the cryptogram to the point-of-sale system via the wireless communication; and
a second non-transitory computer-readable medium including program instructions that, when executed by at least one processor of a server computer in communication with the point-of-sale system, cause the at least one processor of the server computer to perform operations comprising:
receiving the cryptogram and the transaction data from the point-of-sale system;
identifying the user based on the at least one user identifier;
searching the data storage device for data associated with the at least one biometric input from the user;
retrieving stored biometric data associated with the user and used by the mobile device to generate the limited use key from the data storage device;
generating a recreated limited use key based on stored biometric data associated with the user;
generating a recreated cryptogram based at least partially on the recreated limited use key and the transaction data corresponding to the transaction between the user and the merchant;
comparing the recreated cryptogram and the cryptogram received from the mobile device;
determining whether the recreated cryptogram matches the cryptogram received from the mobile device; and
in response to determining that the recreated cryptogram matches the cryptogram received by the point-of-sale system from the mobile device, generate an authorization request message and communicate the authorization request message to an issuer system.

12. The computer program product of claim 11, wherein the transaction data comprises a transaction time, and wherein the cryptogram is generated based at least partially on the transaction time.

13. The computer program product of claim 11, wherein the at least one biometric input comprises at least one of the following: a spoken word or phrase, a fingerprint, a retina, an iris, a face, or any combination thereof.

14. The computer program product of claim 11, wherein the program instructions further cause the mobile device processor to:
generate an account registration message comprising the at least one biometric input; and
communicate the account registration message to the issuer system, wherein the account registration message is generated and communicated prior to generating the limited use key.

* * * * *